Figure 1:
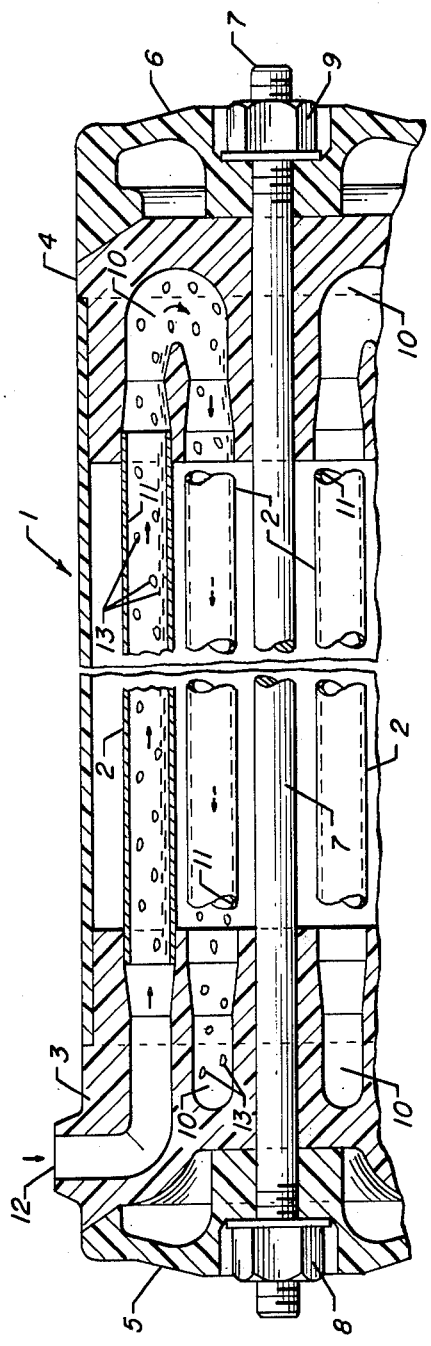

United States Patent [19] [11] 3,912,624
Jennings [45] Oct. 14, 1975

[54] CLEANING OF MEMBRANE SURFACES
[75] Inventor: James L. Jennings, Poway, Calif.
[73] Assignee: Universal Oil Products Company, Des Plaines, Ill.
[22] Filed: Mar. 26, 1974
[21] Appl. No.: 454,883

[52] U.S. Cl. .................. 210/23; 210/409; 210/433
[51] Int. Cl.² ......................................... B01D 13/00
[58] Field of Search .......... 210/355, 353, 433, 321, 210/23, 81, 82, 409, 410, 411

[56] References Cited
UNITED STATES PATENTS
2,570,132  10/1951  Koupal ............................... 210/410
2,710,099   6/1955  Kalihske ............................. 210/410
3,782,556   1/1974  Murkes ............................... 210/409
3,786,924   1/1974  Huffman ............................. 210/257
3,794,169   2/1974  Sisk et al. ...................... 210/411 X Primary Examiner—Frank A. Spear, Jr.
Attorney, Agent, or Firm—James R. Hoatson, Jr.; Philip T. Liggett; William H. Page, II

[57] ABSTRACT

In effecting the periodic cleaning of ultrafiltration and reverse osmosis type membrane separation units, the procedure is improved and shortened by utilizing a plurality of purgings, or flushings, that cause water droplets to be blown along in a high speed air stream such that there is a resulting removal of accumulated solids from a membrane surface. During purging, air is used until substantially all the water droplets are blown off the membrane surfaces but is not continued until the membrane starts to dry out.

5 Claims, 2 Drawing Figures

CLEANING OF MEMBRANE SURFACES

The present invention relates to an improved method for cleaning accumulated solids from a membrane surface used in an ultrafiltration or reverse osmosis type of system.

More particularly, the invention is directed to the relatively simple, speeded-up procedure of using water droplets in repeated introductions of a pressurized, high speed air stream to effect a membrane surface cleaning.

BACKGROUND OF THE INVENTION

In connection with all membrane separation processes, it is considered conventional to periodically back-flush the units and clean the membrane surfaces with a cleaning flow stream. The frequency and the type of cleaning operation will vary with the particular type of feed stream being treated and generally with the amount of solids, grease, fats and oils, etc., that can cause a fouling of the membrane surfaces. It is also known and generally conventional in the membrane separation field to periodically make use of certain additives or cleaning agents. For example, in connection with the handling of certain food materials and in the processing of cheese whey to obtain protein and lactose, there can be the growth of fungus and bacteria on membranes and in headers or other parts of the equipment, particularly in the low flow rate zones. In order to assure an uncontaminated clean system, there can be the use of a sanitizing solution added to a flushing fluid during the periodic cleaning procedure. Such solution may, for example, comprise a mild hypochlorous acid solution or an iodine-phosphoric acid complex, or various of the cleaning agents used in the dairy industry to remove molds and various bacteriological growths. In any event, the typical cleaning operation has embodied time consuming back-flushing and cleaning fluid flow schemes. In contrast, the present improved cleaning system is rapidly carried out with pressurized air and utilizes minimal amounts of water or cleaning liquid.

BRIEF SUMMARY OF THE INVENTION

Actually, it may be considered a principal object of the invention to utilize water droplets in a high speed air stream to effect the removal of the fouling material on a membrane surface. In contrast to slower moving liquid flows, the present improved cleaning system is making use of high velocity air flow and the impingement or scouring effect from the accompanying high speed movements of liquid droplets which will carry along the membrane surfaces with the air stream.

In a related aspect, it may be considered an object of this invention to eliminate the "plug-flow" of a liquid stream in conventional cleaning procedures and substitute a high speed water droplet cleaning system. In each instance, the membrane module is only partly filled with water and then purged with high velocity air for a few minutes so as to force only small slugs of water, and subsequently only water droplets, along the membrane surfaces to effect the removal of accumulated solids.

In a brief embodiment, the invention provides an improved rapid method for cleaning the membrane surfaces of a membrane separation unit after being in use, which comprises the steps of: partially filling the fluid passageways with water and then purging with air at a superatmospheric pressure to cause water droplets to move at high speed over the membrane surfaces and remove accumulated materials; and repeating the operation of the preceding step to effect a substantial removal of all accumulated materials and substantially all water droplets from the membrane surfaces without permitting any drying of the membrane.

In connection with reverse osmosis systems, which operate under higher pressure conditions than ultrafiltration units, it may be advisable to initially effect a removal of pressure through the system and permit an osmotic back-flush through the membranes in order to provide an initial lifting or loosening of accumulated material from membrane surfaces. After permitting the back-flush procedure, then there may be the repeated purgings of fluid passageways and membrane surfaces with high speed air and entrained water droplets. Typically, only a few minutes of operation will be needed for each purging stage and in many instances the entire cleaning procedure may be completed in an approximate 10-minute period.

It is, of course, desirable to have pressurized high speed air streams, with a pressure being in the 20-100 psi range. The required pressure will vary in accordance with the type of membrane system and resistance to flow, or pressure drop considerations, in a particular unit. For example, in modules utilizing a plurality of small diameter membrane containing tubular members, particularly where the fluid flow is in a serpentine manner, there will be a higher pressure drop as compared to a unit embodying the use of a small number of larger diameter tubes, or in comparison with a plate-and-frame arrangement with relatively large cross-sectional area flow paths.

It is, of course, not intended to limit the present improved cleaning system to any one type of module or membrane separation unit inasmuch as the system may be applied to the various types of tubular-form membrane holding members as well as to flat surface membranes used in plate-and-frame constructions. Also, it is not intended to limit the present cleaning operation to any one type of membrane separation procedure although the length of time involved and the number of purge liquid fillings and high speed air stream flows can vary in accordance with the ease of removal of accumulated solid materials on the membrane surface. For example, in cleaning cheese solids, fat globules, etc., from membrane surfaces of an ultrafiltration unit handling cheese whey, a relatively few purge stages of air and water droplets will effect the desired cleaning of the membrane surfaces such that the entire operation may be carried out in a 10-12 minute period. On the other hand, in certain higher pressure operations carried out with reverse osmosis separation units there may be the need to have the initial reverse osmatic pressure back-flushing and a multiplicity of cleaning purges embodying the flow of high speed air and entrained water droplets.

Air alone may be utilized in most cleaning operations, however, it is not intended to limit the present cleaning system to the use of air only inasmuch as pressurized carbon dioxide, nitrogen or other suitable gaseous medium may be used to advantage. In certain instances, it may be of advantage to utilize mixtures of air and low pressure streams. Thus, it is to be noted that the term "air" is used herein in a generic manner and the invention should not be limited to the use of air only. Also, the partial fillings of "water" in order to obtain the "water droplets" may comprise water with an additive material, i.e., a cleaning agent, a bactericide, a sanitizing solution, such as the aforementioned iodine-phosphoric complex, hypochlorous acid, etc. Thus, for the purposes of the invention, the term water is also used in a generic manner and the scope of the invention is not limited to the use of water alone.

In still another aspect, care must be utilized to preclude the drying out of a membrane surface inasmuch as cellulose acetate and other typical membrane materials can be harmed when they are completely dried out. Thus, in any of the repeated purge stages, or in a final purging, care must be exercised to preclude a continual flow of air after most of the water and the water droplets have been purged from the membrane surfaces.

Reference to the accompanying drawing and the following description thereof will serve to diagrammatically illustrate the present improved cleaning operation as well as point out advantageous features in connection therewith.

FIG. 1 of the drawing is a partial sectional elevational view through a tubular form of separation module where membrane surfaces are cast on the inside of a plurality of small diameter tubular members.

Figure 2:
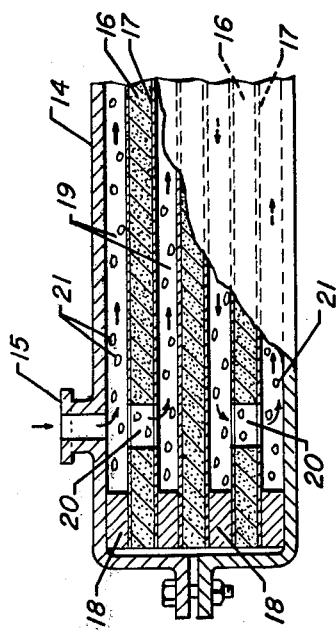

FIG. 2 of the drawing indicates diagrammatically a plate-and-frame type of construction where membrane surfaces are cast onto flat porous supporting members and a serpentine flow arrangement is provided to carry a fluid stream over the plurality of surfaces in the unit.

Referring now to FIG. 1 of the drawing, there is indicated a membrane separation module as defined by an outer housing 1, a plurality of porous tubular-form membrane holding elements 2 and end header members 3 and 4. The latter are, in turn, clamped and held tight over the ends of the respective tubes 2 by end cap members 5 and 6 which tightly engage the respective header means 3 and 4 by virtue of a tensile clamping force being supplied by threaded tie-rod means 7 and threaded nuts 8 and 9.

In the present arrangement, there is a multiple path serpentine flow for the liquid to be treated by virtue of the plurality of U-shaped turn-around means 10 within each header means 3 and 4. Inlet and outlet means are also provided to the header means such that the stream to be processed can be introduced into the serpentine flow path to contact the membrane surfaces within the tubular members 2. In this instance, the interior membrane surfaces 11 are indicated as being cast on the interior of each of the tubular elements 2. There is also indicated an inlet means 12 at the side of header means 3 such that the feed will carry to the tubes 2 and then in the aforementioned serpentine path through the module to an outlet port which can be in either header means 3 or the header means 4. Permeate, which will exude through the membrane surfaces 11 and through the porosity of the tube walls 2, will be collected within the central permeate collecting zone confined by housing 1 and withdrawn therefrom by suitable port means, not shown in the present drawing. Various types of tube constructions may be utilized; however, in each instance, the plurality of tubes 2 will be of a construction to have porosity such as those formed of fiber glass reinforced with porous resin so as to be permeable to pressurized fluid streams, in the manner disclosed in Havens U.S. Pat. No. 3,547,170.

To carry out the present improved cleaning procedure, in accordance with the present invention, there will be a partial filling of the tubular members 2 with water, or with water and added cleaning or sanitizing solution, and then high pressure air is introduced through inlet means 12 so as to cause a high speed air flow through the entire serpentine path of the module and simultaneously to carry a multiplicity of small water droplets 13, such as indicated diagrammatically in the initial tube 2 and in the return passageways 10. The high speed air stream carrying the initial small slugs of water and the resulting entrained water droplets, rather than a slow plug flow of water, effect the desired scouring action and impingement against membrane surfaces, as well as against return-bend passageways, to rapidly dislodge accumulated solids materials from the passageways and membrane surfaces. There can be the repeated partial fillings of fluid into the tubes 2 and the repeated pressurized air introductions to effect a plurality of purges with the desired high speed air stream and entrained droplets until all accumulated materials seem to be removed from the system. As indicated hereinbefore, in connection with many ultrafiltration types of operations, it may result that two, three, or four purges quite efficiently clean the membrane surfaces and other portions of passageways so as to permit the return of the module to an onstream operation. On the other hand, with reverse osmosis systems which may be operating at elevated pressure in the 300–1000 psi range, the solids and greasy materials may become sufficiently embedded within reverse osmosis membranes to the extent that some pressured back-flushing is desirable as a preliminary stage to effecting multiple purges with an air stream and entrained droplets. In certain instances, the rapid dropping of pressure from the reverse osmosis system and the allowing of osmatic back-flush to effect some material lifting from membrane surfaces will suffice as a preliminary step to the repeated air and water droplet purgings.

With reference to FIG. 2 of the drawing, there is indicated a clampable type of housing 14 which encompasses and clamps around a plurality of porous members 16 that, in turn, have membrane surfaces 17 on each face thereof to provide for the desired separation of a feed stream being introduced by way of an inlet port means 15. Spacer means 18 are provided at the ends and side wall portions of membrane supporting member 16 in order to in turn provide the plurality of spaced fluid passageways 19 between spaced members 16. The latter are also provided with suitable openings 20 at alternate ends such that there may be a serpentine flow path for the feed stream entering the unit to pass over the plurality of surfaces 17 along the plurality of passageways 19. The arrangement indicated is, of course, diagrammatic and not intended to be limiting in that various types of flat porous members may be utilized to advantage in supporting membrane surfaces for a plate-and-frame type of separation module. In any event, in accordance with the present invention, when the module surfaces are fouled with an accumulation of solids materials a feed stream is shut down and there is the multiple purgings with an air stream and water droplets. In this instance, the entire module would be partially filled with water and then high pressure air introduced at an inlet port, such as 15, and a high speed air stream caused to flow through the plurality of paths 19 so as to cause water droplets 21 to move at high speed along with the air stream to effect the desired removal of accumulated materials from the membrane surfaces. Again, the operation will be carried out three or four times, or a dozen times, depending on the nature of the accumulations on the membrane surfaces. As heretofore indicated, a few cleanings over a 10–12 minute period will suffice in many cleaning operations while in other instances 10 or more cleanings may be carried out advantageously to provide a desired clean state for the entire module. During the various stages, as well as in a final purge, the high speed flow of air will be carried out for only such period of time as will be necessary to remove all or most of the water droplets from the system and, at the same time, care taken not to permit drying out of any of the membrane surfaces within the module so as to preclude harming the separation efficiency for any one surface.

Reversing of purge direction has also proven to be effective in increasing the degree of cleaning and shortening the time required to accomplish cleaning.

I claim as my invention:

1. An improved rapid method for cleaning the membrane surfaces of a plurality of membrane separation units after being in use, said units having fluid passageways therebetween, which method comprises the steps of: partially filling said fluid passageways, with water, periodically purging said passageways with a continuous air stream at superatmospheric pressure to cause a non-plug flow of water droplets to move at high speed over the membranes of said separation units to thereby remove accumulated materials, prior to each step of partially filling of said passageways with water conducting an osmotic back-flushing through said membrane surfaces whereby to effectuate an initial dislodging of materials from said membrane surfaces, and intermittently repeating said purging step to thereby effect substantial removal of all accumulated materials and all water droplets from said membrane surfaces without permitting drying of said membranes during any stage.

2. The method of claim 1 further characterized in that the fluid passageways are initially partially filled with water containing a cleaning component.

3. The method of claim 1 further characterized in that the fluid passageways are initially partially filled with water containing a sanitizing fluid for the prevention of bacteriological growths.

4. The method of claim 1 further characterized in that the air stream is at a pressure of at least about 20 psi.

5. The method of claim 1 further characterized in that during the repeating of the purging with an air stream there is a reversal of the direction of air flow for at least one of the purges.

* * * * *